(12) United States Patent
Chen

(10) Patent No.: US 8,507,779 B1
(45) Date of Patent: Aug. 13, 2013

(54) MUSICAL INSTRUMENT TRAINING AID

(76) Inventor: Kuan-Hung Chen, Taipei (TW)

(*) Notice: Subject to any disclaimer, the term of this patent is extended or adjusted under 35 U.S.C. 154(b) by 0 days.

(21) Appl. No.: 13/430,955

(22) Filed: Mar. 27, 2012

(51) Int. Cl.
*G09B 15/02* (2006.01)

(52) U.S. Cl.
USPC ........................................ 84/470 R

(58) Field of Classification Search
USPC .............. 84/470 R, 471 R, 472–475, 471 SR, 84/476, 477 R, 478, 479 R, 280, 283 M, 84/274, 281, 290
See application file for complete search history.

(56) References Cited

U.S. PATENT DOCUMENTS 7,605,317 B2 * 10/2009 Chen et al. ...................... 84/281

* cited by examiner

*Primary Examiner* — Kimberly Lockett
(74) *Attorney, Agent, or Firm* — Morton J. Rosenberg

(57) ABSTRACT

A musical instrument training aid for attaching to a violin/cello to support a bow playing the violin/cello is disclosed to include a bridgelike base member having two pairs of pivot shafts at the two ends, four suspension arms respectively pivotally coupled to the pivot shafts, and four anchoring boots respectively capped on the legs of said suspension arms and adapted for securing the suspension arms and the bridgelike base to the waist of the violin/cello.

4 Claims, 6 Drawing Sheets

MUSICAL INSTRUMENT TRAINING AID

BACKGROUND OF THE INVENTION

1. Field of the Invention

The present invention relates to a musical instrument training aid designs and more particularly, to a musical instrument training air for supporting a bow to play a violin/cello, avoiding vibration.

2. Description of the Related Art

A conventional violin/cello training aid is known. This conventional design of violin/cello training aid has a complicated frame structure lockable to the waist of a violin or cello with lock screws. It is inconvenient to mount and dismount this conventional design of violin/cello training aid. More particularly, a young child cannot mount this conventional design of violin/cello training aid to the waist of a violin or cello by oneself.

There is known another conventional design of violin/cello training aid, which is equipped with a strap of hook and loop materials for fastening to the waist of a violin or cello. However, as the surface of a violin or cello is smooth, the strap may be forced out of position easily when the player is moving the bow to plain the violin or cello.

SUMMARY OF THE INVENTION

The present invention has been accomplished under the circumstances in view. It is one object of the present invention to provide a musical instrument training aid, which can be collapsed to reduce the dimension convenient for carrying. It is another object of the present invention to provide a musical instrument training aid, which fits different designs of violins and cellos. It is still another object of the present invention to provide a musical instrument training aid, which supports the bow to play the violin/cello steadily without oscillation.

To achieve these and other objects of the present invention, a musical instrument training aid comprises a bridgelike base member, four suspension arms and four anchoring foots. The bridgelike base member comprises two arched bridge walls arranged in a parallel manner, two brackets respectively connected between said two arched bridge walls at opposing front and rear ends thereof, and two pairs of pivot shafts respectively extended from the opposing front and rear ends of the arched bridge walls at two opposite lateral sides relative to the brackets. The suspension arms are respectively pivotally coupled to the pivot shafts of the bridgelike base member, each comprising a coupling barrel disposed at one end thereof and pivotally coupled to one pivot shaft, a stop block located on the coupling barrel for stopping against one arched bridge wall to limit the angle of rotation of the coupling barrel relative to the respective the pivot shaft, a leg disposed at an opposite end thereof, and a connection portion connected between the coupling barrel and the leg. The anchoring boots are respectively capped on the legs of the suspension arms and adapted for securing the suspension arms and the bridgelike base to a waist of a violin.

DETAILED DESCRIPTION OF THE PREFERRED EMBODIMENT

Figure 1:
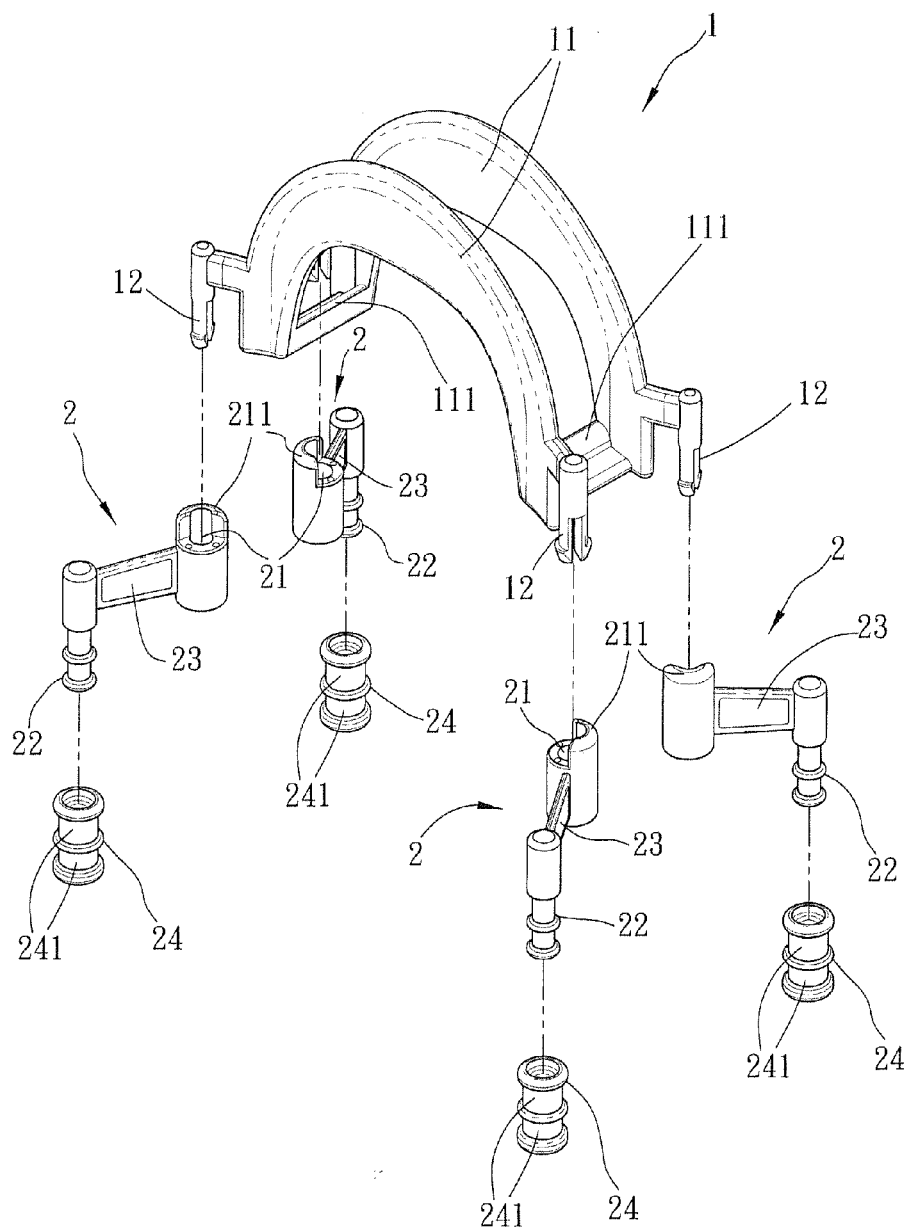
FIG. 1 is an exploded view of a musical instrument training aid in accordance with the present invention.
Figure 2:
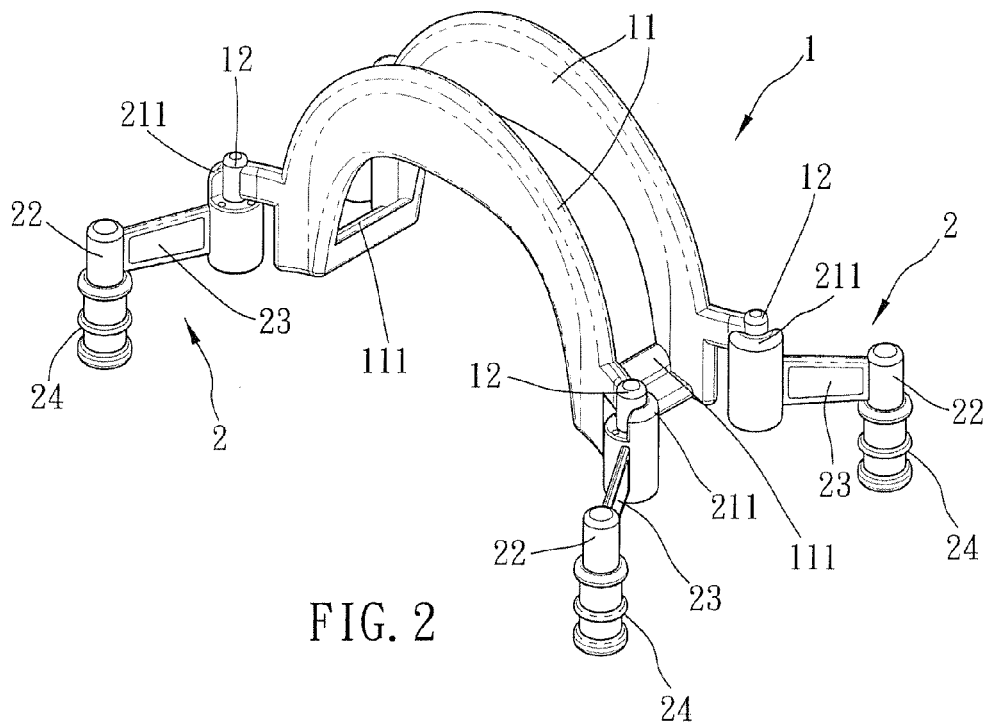
FIG. 2 is an elevational assembly view of the musical instrument training aid in accordance with the present invention.
Figure 3:
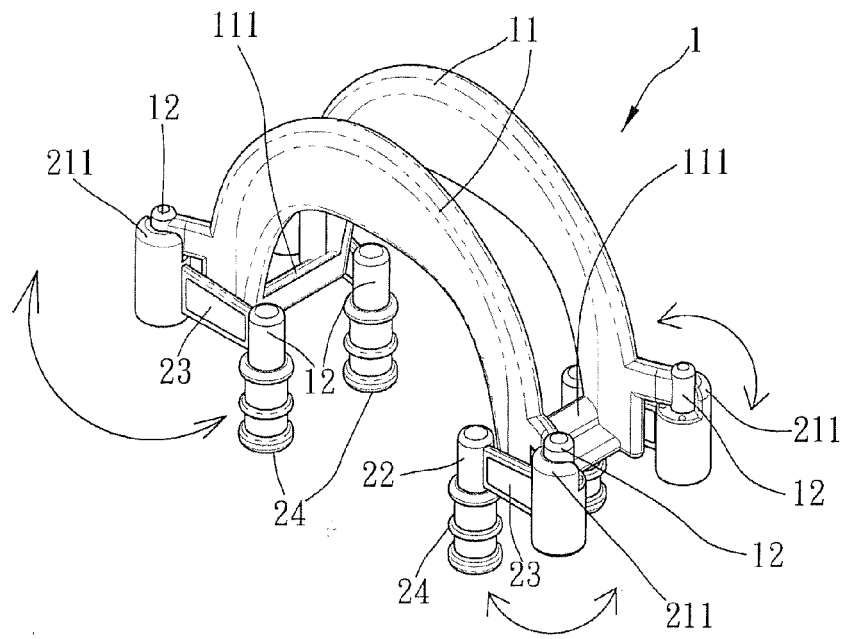
FIG. 3 corresponds to FIG. 2, illustrating the suspension arms turned about the respective pivot shafts to the received position.

Referring to FIGS. 1, 2 and 3, a musical instrument training aid in accordance with the present invention is shown. The musical instrument training aid comprises a bridgelike base member 1, and four suspension arms 2, and four anchoring boots 24.

Figure 4:
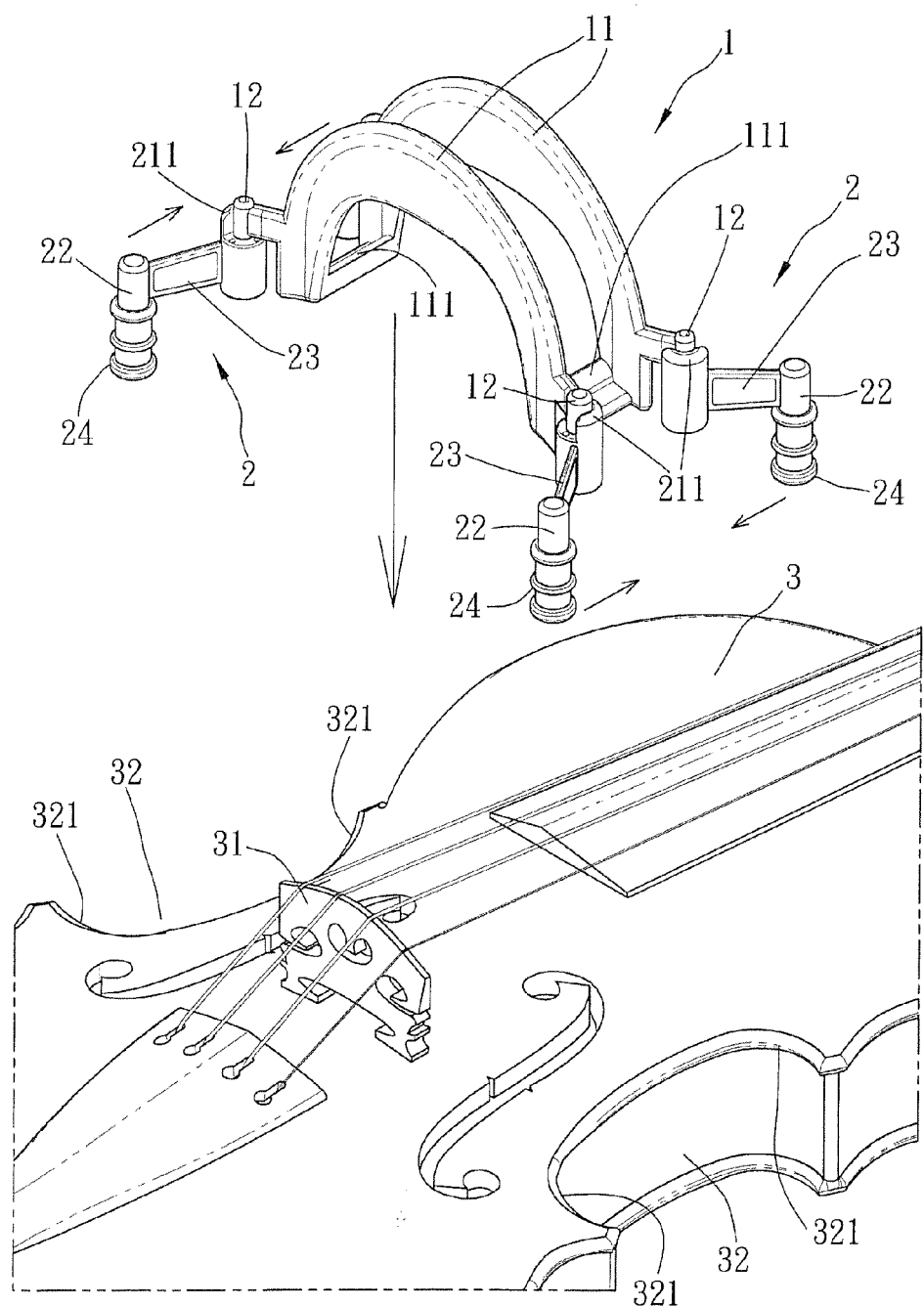
FIG. 4 is a schematic drawing illustrating the installation of the musical instrument training aid in a violin (I).
Figure 5:
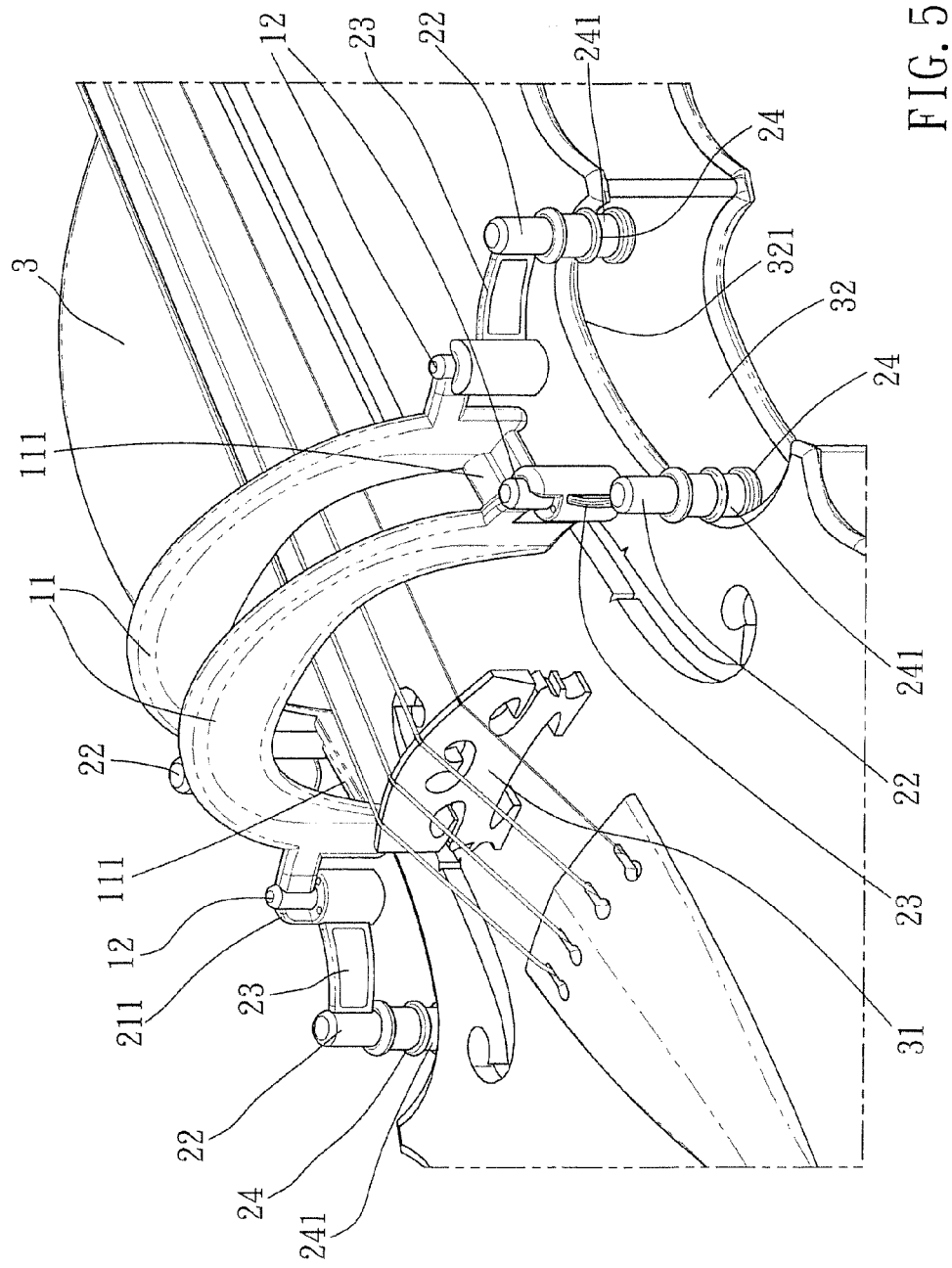
FIG. 5 is a schematic drawing illustrating the installation of the musical instrument training aid in a violin (II).
Figure 6:
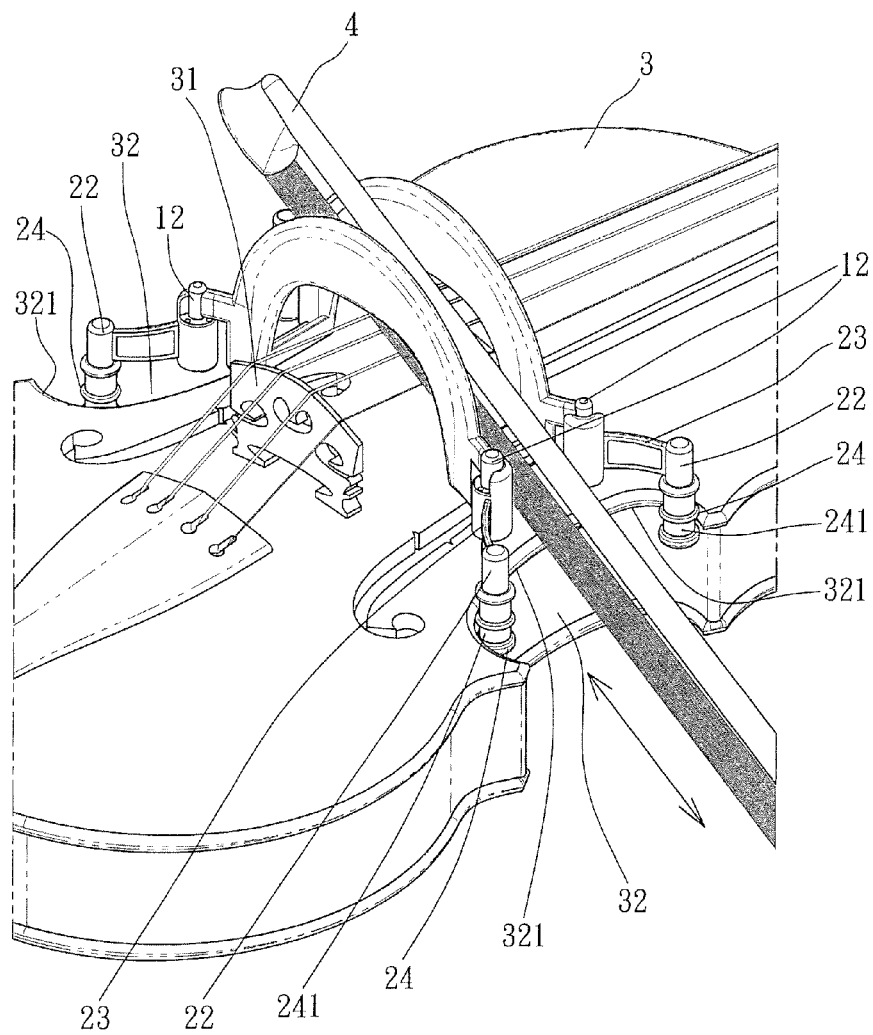
FIG. 6 is a schematic applied view of the musical instrument training aid in accordance with the present invention.
Figure 7:
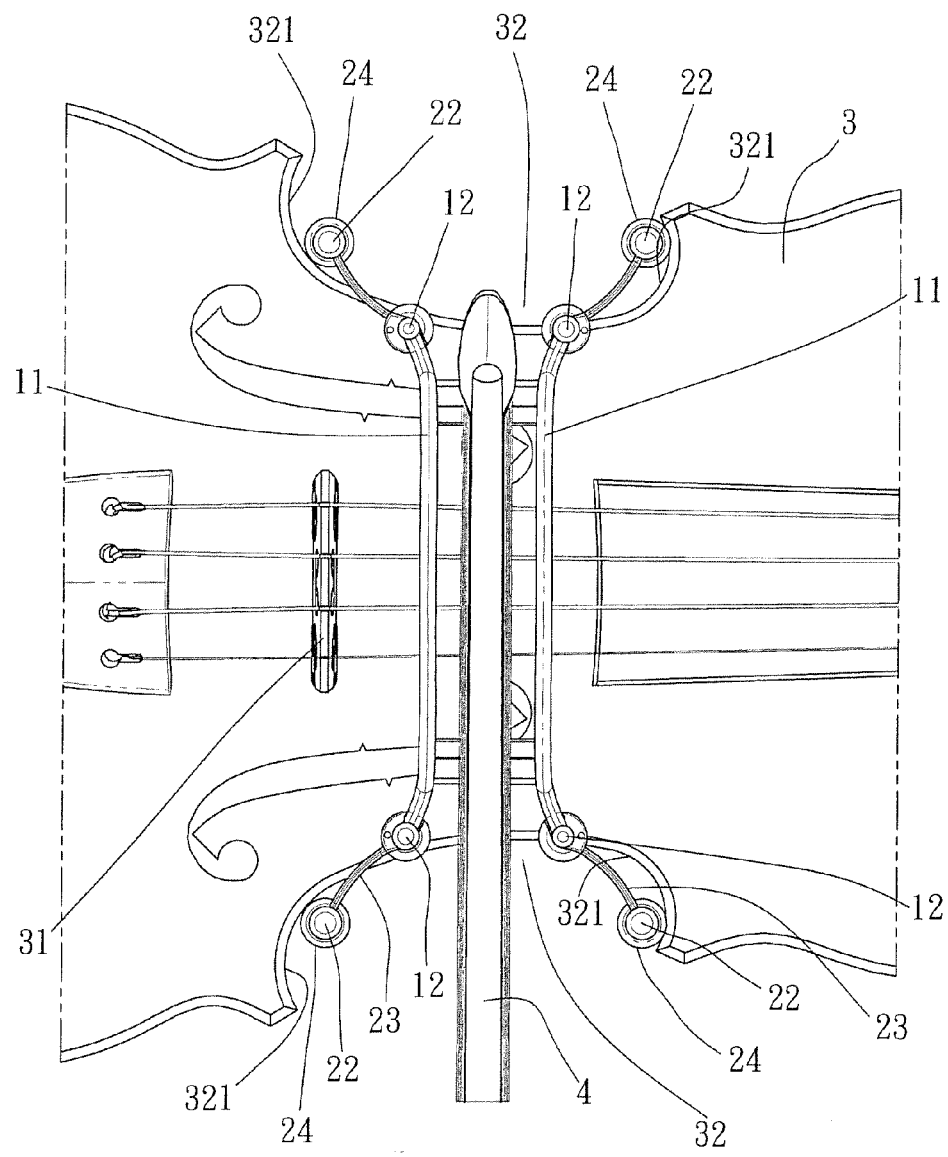
FIG. 7 is a top view of FIG. 6.

The bridgelike base member 1 comprises two arched bridge walls 11 arranged in a parallel manner, two brackets 111 respectively connected between the opposing front and rear ends of the two arched bridge walls 11, and two pairs of pivot shafts 12 respectively extended from the opposing front and rear ends of the arched bridge walls 11 at two opposite lateral sides relative to the brackets 111. The brackets 111 are selectively used for supporting a bow 4 to play a violin 3 (see FIG. 4).

The four suspension arms 2 are respectively coupled to the pivot shafts 12 of the bridgelike base member 1 and turnable about the respective pivot shafts 12 between an extended position (see FIG. 2) and a received position (see FIG. 3). Each suspension arm 2 comprises a coupling barrel 21 disposed at one end thereof and pivotally coupled to one respective pivot shaft 12, a stop block 211 located on the coupling barrel 21 for stopping against the associating arched bridge wall 11 to limit the angle of rotation of the coupling barrel 21 relative to the respective pivot shaft 12, a leg 22 disposed at an opposite end thereof, and a connection portion 23 connected between the coupling barrel 21 and the leg 22. The connection portion 23 can be made of elastic plastics or resilient metal. The four anchoring boots 24 are made of plastics, rubber or silicon rubber, and respectively capped on the legs 22 of the suspension arms 2, each comprising a plurality of annular grooves 241 extending around the periphery thereof at different elevations.

Referring to FIGS. 4-7, during application of the musical instrument training aid, turn the four suspension arms 2 about the respective pivot shafts 12 of the bridgelike base member 1 to the extended position, and then attach the musical instrument training aid to the waist 32 of the violin 3. When the four suspension arms 2 are kept in the extended position, the distance between the two pairs of anchoring boots 24 at the opposing front and rear ends of the bridgelike base member 1 is greater than the width of the waist 32 of the violin 3. Thus, the musical instrument training aid can be conveniently attached to the waist 32 of the violin 3 over the strings of the violin 3, and the then the four suspension arms 2 are turned about the respective pivot shafts 12 of the bridgelike base member 1 in the reversed direction from the extended position toward the received position to force one respective annular groove 241 of each of the four anchoring boots 24 into engagement with the rims 321 of the waist 32 of the violin 3. Thus, the musical instrument training aid is firmly secured to the waist 32 of the violin 3 in front of the bridge 31. At this time, the user can rest the bow 4 on one bracket 111 and pull the bow 4 to play the violin 3.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A musical instrument training aid, comprising:

a bridgelike base member comprising two arched bridge walls arranged in a parallel manner, two brackets respectively connected between said two arched bridge walls at opposing front and rear ends thereof, and two pairs of pivot shafts respectively extended from the opposing front and rear ends of said arched bridge walls at two opposite lateral sides relative to said brackets;

four suspension arms respectively pivotally coupled to said pivot shafts of said bridgelike base member, each said suspension arm comprising a coupling barrel disposed at one end thereof and pivotally coupled to one said pivot shaft, a stop block located on said coupling barrel for stopping against one said arched bridge wall to limit the angle of rotation of said coupling barrel relative to the respective said pivot shaft, a leg disposed at an opposite end thereof, and a connection portion connected between said coupling barrel and said leg; and four anchoring boots respectively capped on said legs of said suspension arms and adapted for securing said suspension arms and said bridgelike base to a waist of a violin.

2. The musical instrument training aid as claimed in claim 1, wherein the connection portion of each said suspension arm is made of an elastic material.

3. The musical instrument training aid as claimed in claim 1, wherein each said anchoring boot comprises a plurality of annular grooves extending around the periphery thereof at different elevations.

4. The musical instrument training aid as claimed in claim 1, wherein said anchoring boots are made of a material selected from the group of plastics, rubber and silicon rubber.

* * * * *